(12) United States Patent
Brady et al.

(10) Patent No.: US 9,143,962 B2
(45) Date of Patent: Sep. 22, 2015

(54) METHOD AND APPARATUS TO ANALYZE A WIRELESS INFORMATION DELIVERY SYSTEM

(75) Inventors: Mark Brady, Stanford, CA (US); Stephen Sposato, Lafayette, CA (US); Jin Wang, Fremont, CA (US); Xidong Wu, San Ramon, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 880 days.

(21) Appl. No.: 13/277,337

(22) Filed: Oct. 20, 2011

(65) Prior Publication Data

US 2013/0100830 A1 Apr. 25, 2013

(51) Int. Cl.
*H04W 24/08* (2009.01)
*H04L 12/26* (2006.01)

(52) U.S. Cl.
CPC .............. *H04W 24/08* (2013.01); *H04L 43/10* (2013.01); *H04L 43/50* (2013.01); *H04L 43/12* (2013.01)

(58) Field of Classification Search
CPC .................................................... H04W 24/08
USPC .............................................. 370/252, 241.1
See application file for complete search history.

(56) References Cited

U.S. PATENT DOCUMENTS

| | | | |
|---|---|---|---|
| 7,184,770 B1* | 2/2007 | Narasimhan et al. | ......... 455/446 |
| 2002/0087529 A1 | 7/2002 | Dutcher et al. | |
| 2006/0030340 A1 | 2/2006 | Lin et al. | |
| 2006/0116853 A1* | 6/2006 | Rappaport et al. | ............ 702/182 |
| 2008/0293404 A1 | 11/2008 | Scherzer et al. | |
| 2009/0040937 A1* | 2/2009 | Xhafa et al. | ................... 370/252 |
| 2010/0246416 A1* | 9/2010 | Sinha et al. | .................... 370/250 |
| 2011/0032913 A1* | 2/2011 | Patil et al. | ...................... 370/338 |

OTHER PUBLICATIONS

"WiFi Mapping Software: Footprint," Alyrica, http://www.alyrica.net/wifi_mapping; printed May 25, 2011, 4 pages.
"How to Create a Wireless Coverage Map (Heat map)," PassMark Software, http://www.passmark.com/support/wireless_coverage_map.html; printed May 25, 2011, 5 pages.
"WirelessMon: Monitor Wireless 802.11 WiFi," PassMark Software, http://www.passmark.com/products/wirelessmonitor.htm; printed May 25, 2011, 2 pages.
"Ekahau HeatMapper—The Free Wi-Fi Coverage Mapping Site Survey Tool," Powered by Ekahau Site Survey Technology, http://www.ekahau.com/products/heatmapper/overview.html; printed May 25, 2011, 2 pages.
Nistor, Codrut, "Wireless Signal Strength Maps for Windows Users," PCTIPS3000, http://www.pctips3000.com/wireless-signal-strength-maps-for-windows-users/; Jun. 19, 2009, 2 pages.
Cola, Jack, "Measure Wi-Fi Signal Strength at Your Home with HeatMapper," http://www.makeuseof.com/tag/map-your-homes-wifi-signal-strength-with-heatmapper/; Jul. 1, 2009, 5 pages.
U.S. Appl. No. 13/098,775, filed May 2, 2011.

* cited by examiner

Primary Examiner — Dang Ton
Assistant Examiner — Kevin Lee
(74) Attorney, Agent, or Firm — Toler Law Group, PC

(57) ABSTRACT

A method includes receiving a packet stream via a wireless signal from a device of a wireless information delivery system. The method includes determining wireless signal data associated with the wireless signal during a particular time interval, determining packet stream data associated with the packet stream during the particular time interval, and analyzing the wireless signal data and the packet stream data to produce an assessment of at least a portion of the wireless information delivery system.

20 Claims, 11 Drawing Sheets

METHOD AND APPARATUS TO ANALYZE A WIRELESS INFORMATION DELIVERY SYSTEM

FIELD OF THE DISCLOSURE

The present disclosure is generally related to analyzing a wireless information delivery system.

BACKGROUND

A wireless local area network may provide wireless access to a network at multiple locations within a coverage area (e.g., a particular geographic area). Wireless local area networks enable network-connected devices to be moved within the coverage area. However, signal strength of the wireless local area network may be better at some locations than at other locations within the coverage area. If a problem develops related to network access via wireless connection, it can be difficult to determine whether the problem is related to communications in the network or is related to problems with the wireless connection.

DETAILED DESCRIPTION

Figure 1:
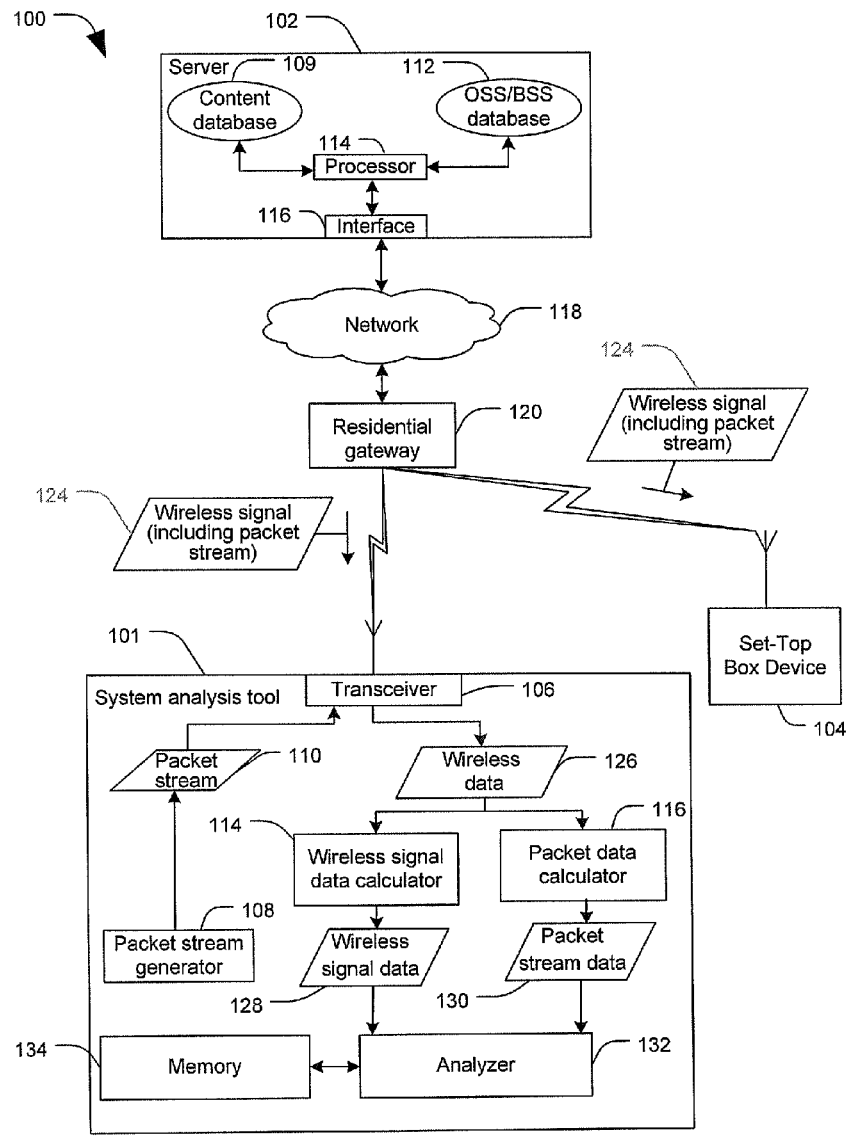
FIG. 1 is a block diagram illustrating a particular embodiment of a system to analyze a wireless information delivery system.

A wireless information delivery system may enable network access at a particular location (e.g., a subscriber premises). The wireless information delivery system may include a residential gateway that communicates with a provider via, e.g., a wired communication medium, such as a coaxial cable or a twisted wire pair, an optical fiber, or a combination thereof. A communication path between the residential gateway and the provider may also include one or more wireless connections, such as a satellite transmission, a wireless data transmission (e.g., WiFi, WiMAX), another data transmission, or any combination thereof. The residential gateway may provide wireless access to the network for one or more devices, such as a set-top box, via, e.g., a local transmitter that may reside within or be coupled to the residential gateway.

An installation technician may be sent to install customer premises equipment at the subscriber premises. The customer premises equipment may be intended to provide network access within a predetermined space. The customer premises equipment may include the residential gateway and one or more set-top boxes. As part of an install procedure the technician may create an initial parameter map associated with the subscriber premises. The initial parameter map may include measurements of various system parameters associated with information reception via a wireless local area network including the customer premises equipment. The measured parameters may be related to wireless signal strength, packet stream data, or a combination thereof, and may be measured at several geographic positions within a predetermined space (e.g., the subscriber premises) using a system analysis tool that may have a capability to measure and analyze parameters associated with signal transmission and packet transmission. The installation technician may upload the initial parameter map to a central repository that stores subscriber information associated with each subscriber to a communication service offered by the provider.

When a communication service problem, such as a dropped connection, an intermittent connection, or another problem, is experienced by the subscriber, the provider may be contacted by the subscriber with a request to remedy the problem. The provider may send a repair technician to the subscriber premises in order to troubleshoot and remedy the problem. Use of the system analysis tool having the capability to measure and analyze parameters associated with signal transmission and packet transmission may enable the repair technician to efficiently identify the problem and to implement a solution.

For example, the repair technician may create a current parameter map using the system analysis tool. The repair technician may download the initial parameter map for comparison to the current parameter map. The comparison of the two maps may enable the repair technician to quickly recognize a source of the reported problem. For example, rearrangement of furniture by the subscriber may result in a difference in certain measured parameter values (e.g., signal strength) at various locations and may be detected through comparison of the two maps. Discovering one or more difference by comparison of the initial parameter map to the current parameter map may shorten time to troubleshoot the residential system.

In a particular embodiment, a method includes receiving a packet stream via a wireless signal from a device, e.g., a wireless gateway, of a wireless information delivery system. The method includes determining wireless signal data associated with the wireless signal during a particular time interval, determining packet stream data associated with the packet stream received during the particular time interval, and analyzing the wireless signal data and the packet stream data to produce an assessment of at least a portion of the wireless information delivery system.

In a particular embodiment, an apparatus includes a system analysis tool including a processor configured to determine wireless signal data associated with a wireless signal received from a wireless information delivery system during a particular time interval. The processor is configured to determine packet stream data associated with a packet stream received during the particular time interval via the wireless signal. The processor is configured to analyze the wireless signal data and the packet stream data to produce an assessment of at least a portion of the wireless information delivery system. For example, the assessment may include an indication of one or more anomalies in the wireless signal data and the packet stream data that may be associated with one or more root causes of a reported problem associated with the wireless information delivery system.

In a particular embodiment, a computer-readable medium stores processor-executable instructions that, when executed by a processor, cause the processor to receive a packet stream via a wireless signal from a device of a wireless information delivery system. The computer-readable medium stores processor-executable instructions that, when executed by the processor, cause the processor to determine wireless signal data associated with the wireless signal during a particular time interval, to determine packet stream data associated with the packet stream received during the particular time interval, and to analyze the wireless signal data and the packet stream data to produce an assessment of at least a portion of the wireless information delivery system.

FIG. 1 is a block diagram illustrating a particular embodiment of a system analysis tool 101 to provide an analysis of a wireless information delivery system 100 that may include a residential gateway 120, a network 118, and one or more set-top boxes, such as a set-top box 104. The wireless information delivery system 100 includes a server 102 that may provide content to one or more set-top box devices, such as a set-top box device 104, via a network 118. The wireless information delivery system 100 includes a residential gateway 120 that may be coupled to the network 118 and may be configured to provide content to the set-top box device 104 via a wireless signal 124 from the residential gateway 120. In a particular embodiment, wireless (WiFi) capability may be directly integrated into the residential gateway 120. In another particular embodiment, the WiFi capability may be implemented in a separate device, e.g. a discrete device (not shown), that is communicatively coupled to the residential gateway 120. The system analysis tool 101 can monitor wireless signals sent by the residential gateway 120 to the set-top box 104. The server 102 may also provide content via the network 118 to the system analysis tool 101 via the wireless signal 124.

The server 102 may include a processor 114 coupled to an interface 116. The interface 116 may be coupled to the network 118. The server 102 may also include or be coupled to a content database 109. The content database 109 may provide content, such as video content, to the processor 114. The processor 114 may provide the content to the network 118 via the interface 116. Content may also be retrieved by the server 102, e.g., from an external source (not shown) via the network 118, and the retrieved content may be provided to one or more recipients via the network 118. The server 102 also may include, or be coupled to, an operations systems server/billing systems server (OSS/BSS) database 112. The OSS/BSS database 112 may store subscriber-related data. For example, the OSS/BSS database 112 may store analysis results obtained by the system analysis tool 101. The stored results may be retrieved at a future time (e.g. in response to a reported problem) as reference data that may be used for troubleshooting purposes.

The system analysis tool 101 may include a transceiver 106, a packet stream generator 108, a wireless signal data calculator 114, a packet data calculator 116, and an analyzer 132. The packet stream generator 108 may be configured to generate one or more packet streams, such as a packet stream 110. The packet stream 110 may be transmitted to the residential gateway 120 wirelessly via the transceiver 106. The residential gateway 120 may transmit a wireless signal 124 that includes the packet stream 110 that the residential gateway 120 received from the system analysis tool 101.

The system analysis tool 101 can monitor wireless signals, such as the wireless signal 124 sent by the residential gateway 120 to the set-top box 104. For example, the transceiver 106 may receive the wireless signal 124 broadcast from the residential gateway 120. The transceiver 106 may provide wireless data 126 to the wireless signal data calculator 114 and to the packet data calculator 116. In response to the wireless data 126, the wireless signal data calculator 114 may output wireless signal data 128. In response to the wireless data 126, the packet data calculator 116 may output packet stream data 130. The wireless signal data 118 and the packet stream data 130 may be input to the analyzer 132.

In operation, the server 102 may send content, such as video content, audio content, a mixture of video content and audio content, or other content to the set-top box device 104. The content may be transmitted via the network 118 to the residential gateway 120. The residential gateway 120 may communicate the content via the wireless signal 124. For example, the residential gateway 120 may send the wireless signal 124 to the set-top box device 104. The set-top box device 104 may receive the wireless signal 124 and may send data recovered from the wireless signal 124 to, e.g., a television receiver (not shown). The wireless signal 124 may also be received by the system analysis tool 101.

A repair technician may employ the system analysis tool 101 to troubleshoot a residential system that includes the residential gateway 120 and one or more set-top boxes, including the set-top box device 104. The system analysis tool 101 may send the packet stream 110 to the residential gateway 120 via the transceiver 106. Alternatively, the packet stream 110 may be generated by the processor 114 of the server 102 and may be sent to the residential gateway 120, e.g., via the network 118. The residential gateway 120 may retransmit the packet stream 110 in one or more wireless signals, such as the wireless signal 124.

The wireless signal 124 may be received by the transceiver 106 of the system analysis tool 101. The transceiver 106 may output the wireless data 126 based on the wireless signal 124. The wireless data 126 may be input to the wireless signal data calculator 114, where one or more signal parameters may be calculated. The wireless data 126 may also be supplied to the packet data calculator 116, where one or more packet parameters may be calculated. The wireless signal parameters calculated by the wireless signal data calculator 114 may be provided to the analyzer 132 as wireless signal data 128. The packet parameters calculated by the packet data calculator 116 may be provided to the analyzer 132 as packet stream data 130. The analyzer 132 may analyze the wireless signal data 128 and the packet stream data 130 and may provide an analysis of the system 100 based upon the wireless signal parameters and the packet data parameters. The analysis may be stored locally in a memory 134, may be stored remotely, e.g. in the OSS/BSS database 112, or both. In a particular embodiment, the wireless signal data 128 and the packet stream data 130 may be analyzed (e.g., correlated) to identify a specific problem. In another particular embodiment, the system analysis tool 101 may be used to map the wireless signal data 128 and the packet stream data 130 at several locations within a particular space, such as at multiple locations within a residence, in order to identify a cause of a problem, such as a content reception problem, being experienced by a subscriber in the particular space. In a particular embodiment, the repair technician may create a current parameter map by mapping the wireless signal data 128 and the packet stream data 130. The repair technician may troubleshoot a reported problem in the residential system by comparing the current parameter map to the initial parameter map that may be, e.g., downloaded from the OSS/BSS database 112. Through a comparison of the current parameter map with the initial parameter map, the repair technician may discover one or more anomalies that may help the repair technician to conduct an efficient analysis and identify a source of the reported problem.

In a particular embodiment, the packet stream 110 may include predefined data (e.g., test data) that may be reflected in the wireless data 126 and that may be analyzed at the system analysis tool 101. For example, by analyzing changes in the packet stream 110 that occur as a result of wireless transmission from the residential gateway 120 to the transceiver 106 at various geographic locations within a predefined geographic area, such as a residence or an office, the analyzer 132 may determine that a cause of a problem is positioning of the residential gateway 120, data delivery difficulties resulting from a malfunction at the server 102 or at the network 118, another cause of the problem, or a combination thereof.

Figure 2:
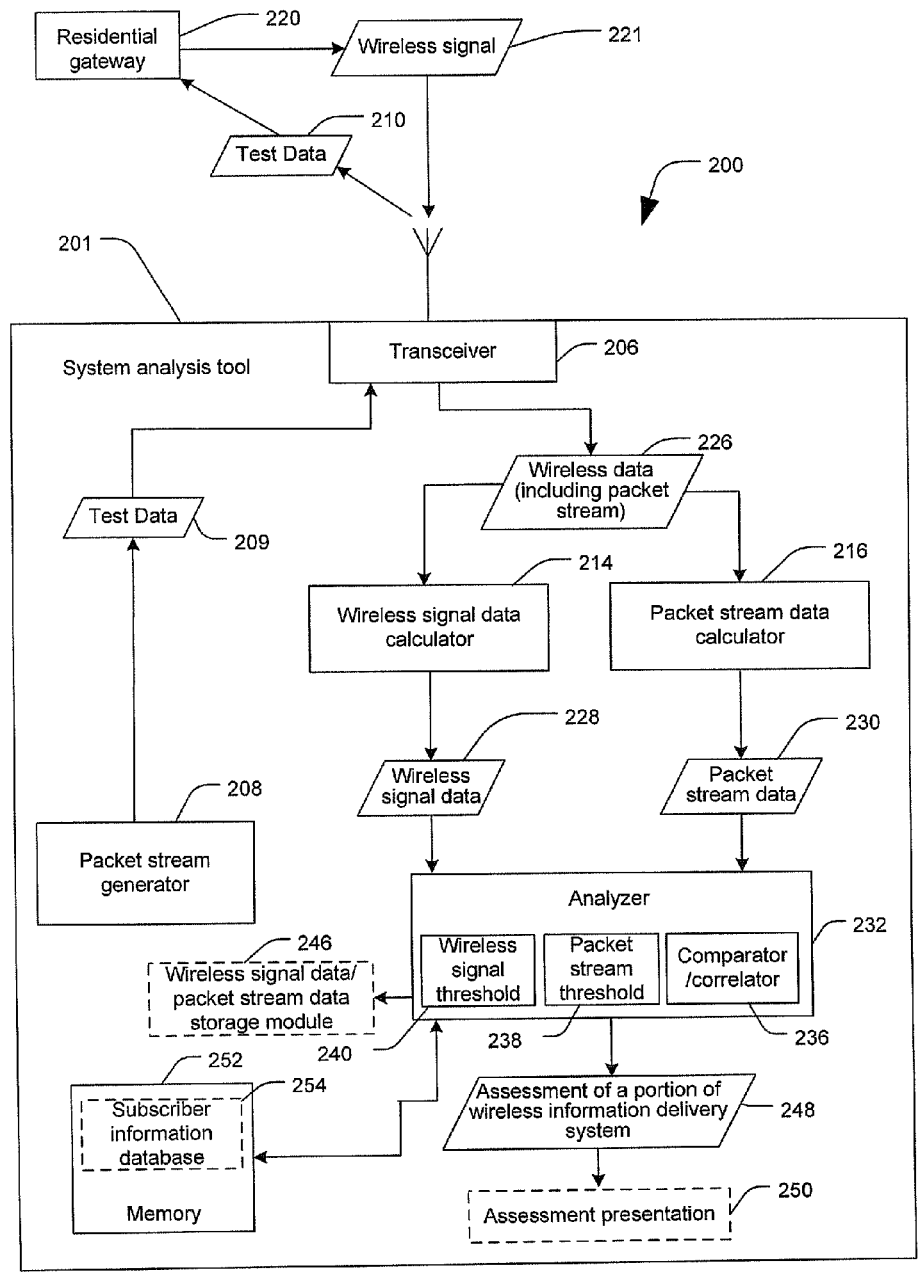
FIG. 2 is a block diagram illustrating a particular embodiment of an apparatus to analyze a wireless information delivery system.

FIG. 2 is a block diagram illustrating a particular embodiment of a system 200 to analyze a wireless information delivery system, such as the wireless information delivery system 100 of FIG. 1. The system 200 includes a residential gateway 220 and a system analysis tool 201. The residential gateway 220 may receive test data, such as test data 210, received from the system analysis tool 201, from a remote server (not shown), or from both. For example, the residential gateway 220 may receive data, including the test data 210, from a remote server, such as the server 102 of FIG. 1. The residential gateway 220 may send a wireless signal 221 to the system analysis tool 201. The system analysis tool 201 may include a transceiver 206, a packet stream generator 208 coupled to the transceiver 206, a wireless signal data calculator 214 coupled to the transceiver 206, a packet stream data calculator 216 coupled to the transceiver 206, an analyzer 232 coupled to the wireless signal data calculator 214 and coupled to the packet stream data calculator 216, and a memory 252 coupled to the analyzer 232.

In operation, the system analysis tool 201 may generate test data 209 in the packet stream generator 208. The system analysis tool 201 may output the test data 209 to the residential gateway 220 via wireless transmission as test data 210. The residential gateway 220 may send a wireless signal 221 that includes data based on received test data 210 to the system analysis tool 201. In the system analysis tool 201, the transceiver 206 may output wireless data 226 including a packet stream based on the test data 210 (e.g., the packet stream may include the test data 210). The wireless data 226 may be input to the wireless signal data calculator 214 and may be input to the packet stream data calculator 216.

The wireless signal data calculator 214 may output the wireless signal data 228 based upon the wireless data 226. Measurements may be made at various geographic locations within a particular space (e.g., a predefined space) by moving the signal analysis tool 201 to each geographic location and measuring parameters associated with the wireless data 226, such as a wireless signal parameter, a packet stream parameter, or both. For example, the wireless signal data calculator 214 may be used to detect a first value of a wireless signal parameter based on the wireless data 226 measured at a first geographic location within the particular space during a particular time interval, and the wireless signal data calculator 214 may be used to detect a second value of the wireless signal parameter based on the wireless data 228 measured at a second geographic location within the particular space during a corresponding time interval. The wireless signal data 228 may include one or more wireless signal parameters, such as a wireless signal strength, a wireless received signal strength indicator (RSSI), a basic service set identifier (BSSID), a service set identifier (SSID), supported data rates, a center frequency, a bandwidth, beacon frame parameters, an integrated encryption scheme (IES), encryption or authentication information, a count of antennas, spatial stream capabilities, a modulation that may include one or more of direct-sequence spread spectrum (DSSS), frequency hopping spread spectrum (FHSS), orthogonal frequency-division multiplexing (OFDM), packet loss rate, signal-to-noise ratio, receive noise level indication, other signal parameters, or any combination thereof.

The packet stream data calculator 216 may provide packet stream data 230 that may be based on the wireless data 226. For example, the packet stream data calculator 216 may determine a parameter value (e.g., a count of packets that arrived in total) associated with the wireless data 226 at several geographic locations within a particular space, such as a subscriber premises, measured at times within a testing time period, e.g., while the repair technician is at the subscriber premises. The packet stream data 230 may include one or more packet stream parameter values. For example, the packet stream data calculator 216 may detect a first value of a packet stream parameter associated with the wireless data 226 at the first geographic location within the particular space (e.g., the subscriber premises) during a particular time period and the packet stream data calculator 216 may detect a second value of the packet stream parameter at the second geographic location within the particular space during the particular time period. The packet stream data 230 may be determined based on the first value of the packet stream parameter and the second value of the packet stream parameter. The packet stream data 230 may include one or more packet stream parameters, such as a number of "holes" (large gaps in a packet stream), a number of packets that arrived too late to be used, a number of packets that arrived in total, a number of audio digital rights management/cryptographic errors, a number of video digital rights management/cryptographic errors, a multicast join delay, packet retransmission statistics that may include packet retransmission rate, packet error rate, packet transmission speed, packet collisions, packet latency, ping time, forward error correction (FEC) statistics, such as internet protocol television forward error correction statistics, error concealment/macro-blocking statistics, other packet stream parameters, packet arrival time jitter, out-of-order packet arrivals, packet retransmission delay, packet retransmissions not successful within a particular time interval (e.g., the time interval begins at a time that retransmission was requested and lasts for a particular time period), or any combination thereof.

The wireless signal data 228 and the packet stream data 230 may be input to the analyzer 232. The analyzer 232 may analyze each of the wireless signal parameter values input from the wireless signal data calculator 214 and each of the packet stream parameter values that have been input from the packet stream data calculator 216. In a particular embodiment, the analyzer 232 may analyze the wireless signal parameter values and the packet stream parameter values to determine a wireless signal acceptability. In one example, the wireless signal acceptability may be determined by comparing a particular wireless signal parameter to a corresponding wireless signal threshold 240. A packet stream acceptability may be determined by comparing a particular packet stream parameter to a corresponding packet stream threshold 238. A degree of correlation between the wireless signal acceptability and the packet stream acceptability is determined via a comparator/correlator module 236. For example, the comparator/correlator module 236 may be used to compare a first wireless signal strength parameter value to the wireless signal threshold 240, yielding a first wireless signal strength parameter value comparison. For example, the comparison may indicate that the wireless signal strength is below the wireless signal threshold 240. Additionally, each of one or more packet stream parameter values may be compared to respective packet stream threshold values by the comparator/correlator module 236. For example, a first packet stream parameter value may be compared with the packet stream threshold 238 by the comparator/correlator module 236.

A correlation of wireless signal parameters and packet stream parameters may be carried out by the comparator/correlator module 236. For example, variations in RSSI (received signal strength indicator) of the WiFi signal over time at a particular position within the subscriber premises may be correlated to one or more of variations in packet error rate, packet retransmission rate, and one or more internet protocol television statistics. An outcome of the correlation may indicate that transmission errors are attributable to signal level fluctuation and may prompt a service technician to reposition some of the installed equipment in the subscriber premises. In another example, several wireless signal parameters may be correlated at a plurality of locations within the subscriber premises. A large variation within a short distance between locations may be indicative of weak or inconsistent signal reception. In yet another example, by correlating locations within the subscriber premises where the RSSI is acceptable (i.e., satisfies a signal strength threshold) and the packet error/loss in a packet stream is acceptable (e.g., packet error/loss is less than a packet error/loss threshold), a service technician can determine those locations to be acceptable locations for reception, e.g., suitable locations at which to locate wireless reception equipment.

The analyzer 232 may output an analysis that includes an assessment 248 of the wireless information delivery system 200 based upon the correlation. The assessment 248 of the wireless information delivery system may be presented to a user, such as a technician, as an assessment presentation 250.

The system analysis tool 201 may be configured to store a data record based on testing during a particular time interval (e.g., the time period during which the repair technician records signal and packet measurements). The data record may include, e.g., a mapping of the wireless signal data 228 and the packet stream data 230 at one or more locations within a particular geographical area, an identifier of a subscriber, an identifier of the particular time interval, location data associated with the particular space, other information, or any combination thereof. For example, a wireless signal data/packet stream data storage module 246 of the system analysis tool 201 may cause the wireless signal data 228 and the packet stream data 230 to be stored as the data record. In a particular embodiment, the system analysis tool 201 may store the data record at, e.g., an internal subscriber information database 254 in the memory 252. Alternatively, the system analysis tool 201 may store the data record remotely by transmitting the data record to an external database, such as the OSS/BSS database 112 of FIG. 1.

In a particular embodiment, the repair technician may create a current parameter map by mapping the wireless signal data 228 and the packet stream data 230 at various points within a predetermined space (e.g., a subscriber premises boundary that surrounds the residential gateway 220). The repair technician may troubleshoot a reported problem in the residential system by downloading an initial parameter map generated at time of installation and stored, e.g., at the OSS/BSS database 112. Comparison of data in the current parameter map to the initial parameter map may help the repair technician to identify a source of the reported problem.

Figure 3:
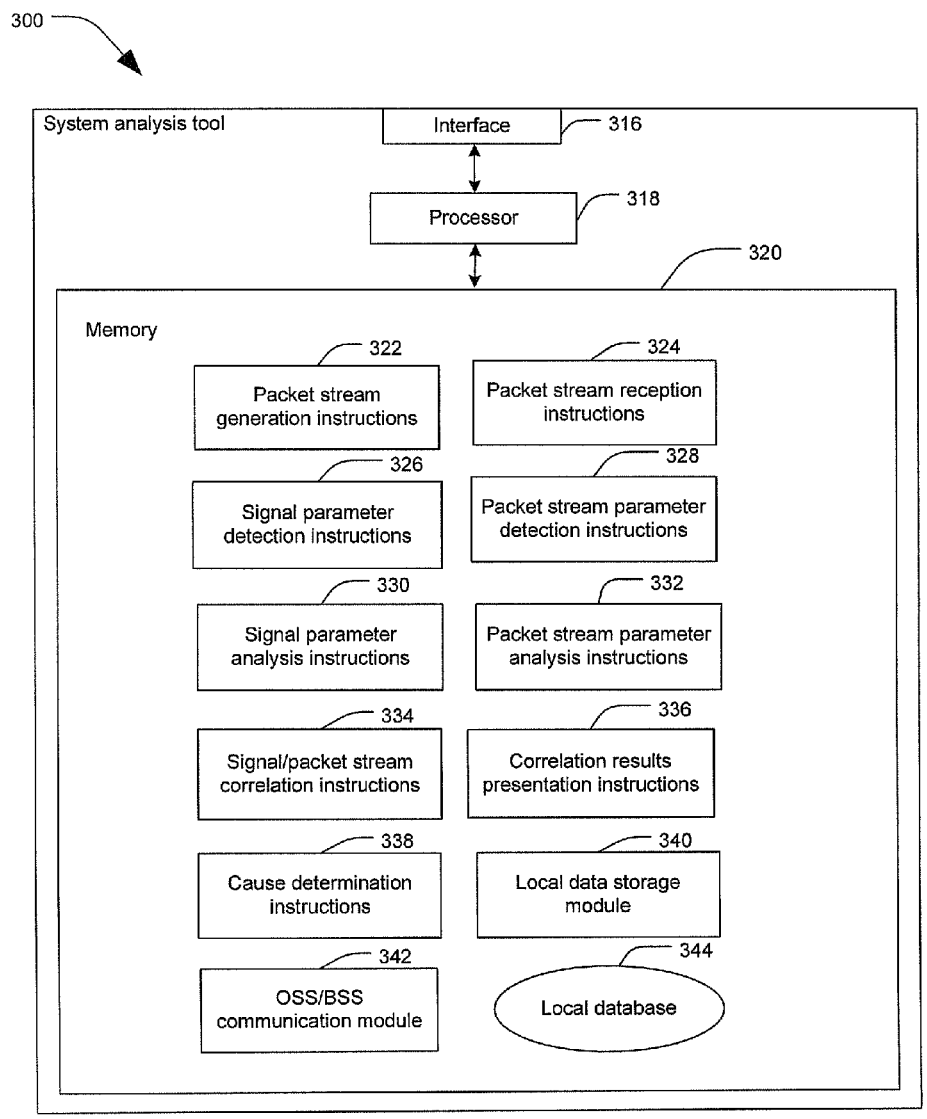
FIG. 3 is a block diagram illustrating another particular embodiment of an apparatus to analyze a wireless information delivery system.

FIG. 3 is a block diagram illustrating a particular embodiment of a system analysis tool 300 to analyze a wireless content delivery system. The system analysis tool 300 may include an interface 316, a processor 318, and a memory 320. The interface 316 may serve to interface with a provider of wireless signals, such as the residential gateway 220 of FIG. 2, or the residential gateway 120 of FIG. 1. The interface 316 may be coupled to the processor 318. For example, the interface 316 may correspond to, include, or be included within the transceiver 106 of FIG. 1 or the transceiver 206 of FIG. 2. Additionally, the processor 318 may correspond to, include, or be included within the analyzer 132 of FIG. 1 or the analyzer 232 of FIG. 2. The processor 318 may be coupled to the memory 320.

In a particular embodiment, the processor 318 may execute instructions stored in the memory 320 to analyze the wireless content delivery system. For example, the processor 318 may be configured to execute instructions to determine wireless signal data associated with a wireless signal received from a wireless information delivery system during a particular time interval. The processor 318 may also be configured to execute instructions to determine packet stream data associated with a packet stream received during the particular time interval via the wireless signal. The processor 318 may further be configured to execute instructions to analyze the wireless signal data and the packet stream data, to produce an assessment of at least a portion of the wireless information delivery system.

The memory 320 may include a plurality of sets of instructions, each of which may be executable by the processor 318. The processor 318 may execute packet stream generation instructions 322 to generate predefined test data to be included in a packet stream. The packet stream may be provided to a residential gateway, such as the residential gateway 220 of FIG. 2, via the interface 316. The processor 318 may execute packet stream reception instructions 324 to receive the packet stream in a wireless signal from a device of a wireless information delivery system, such as the wireless information delivery system 100 of FIG. 1. The processor 318, executing the packet stream reception instructions 324, may also receive other data, such as video from a server or test data from the server, such as the server 102 of FIG. 1.

The processor 318 may execute signal parameter detection instructions 326 to detect one or more wireless signal parameter values associated with a wireless signal received during a particular time interval, the wireless signal carrying the packet stream. The processor 318 may execute the signal parameter analysis instructions 326 to analyze the wireless signal parameter values that have been detected and to produce wireless signal data.

The processor 318 may execute the packet stream parameter detection instructions 328 to detect one or more packet stream parameter values associated with the packet stream that may have been received via the wireless signal. The processor 318 may execute the packet stream parameter analysis instructions to analyze the packet stream parameter values that have been detected to produce packet stream data.

The processor 318 may execute the signal/packet stream correlation instructions 334 to analyze the wireless signal data and the packet stream data, producing an assessment of at least a portion of the wireless information delivery system. Analyzing the wireless signal data and the packet stream data may include correlating the wireless signal data and the packet stream data to produce wireless signal/packet stream correlation results. The processor 318 may execute the wireless signal/packet stream correlation results presentation instructions 336 to provide the wireless signal/packet stream correlation results in a presentation that may be accessible by a user, such as a repair technician. The processor 318 may execute determination instructions 338 to determine a suspected cause of a particular behavior of the wireless information delivery system, e.g., based upon the wireless signal/packet stream correlation results.

In a particular embodiment, the repair technician may create a current parameter map by mapping wireless signal data measured by the system analysis tool 300, such as the wireless signal data 128, and the packet stream data measured by the system analysis tool 300, such as the packet stream data 130. The repair technician may troubleshoot a reported problem in the residential system by downloading an initial parameter map stored, e.g., at the OSS/BSS database 112. By comparing the current parameter map to the initial parameter map, the repair technician may be able to efficiently identify a source of the reported problem. The comparison may be carried out automatically, by e.g., the system analysis tool 300. For example, the signal/packet stream correlation instructions 334 may include instructions to compare the current parameter map and the initial parameter map and to identify one or more anomalies in corresponding parameter values.

The processor 318 may execute the instructions in the local data storage module 340 to store the wireless signal data, the packet stream data, and/or the wireless signal/packet stream correlation results in the local database 344. The processor 318 may execute the OSS/BSS communication module 342 to transmit the wireless signal data, the packet stream data, and/or the wireless signal/packet stream correlation results to a remote database, such as the OSS/BSS database 112 of FIG. 1.

Figure 4:
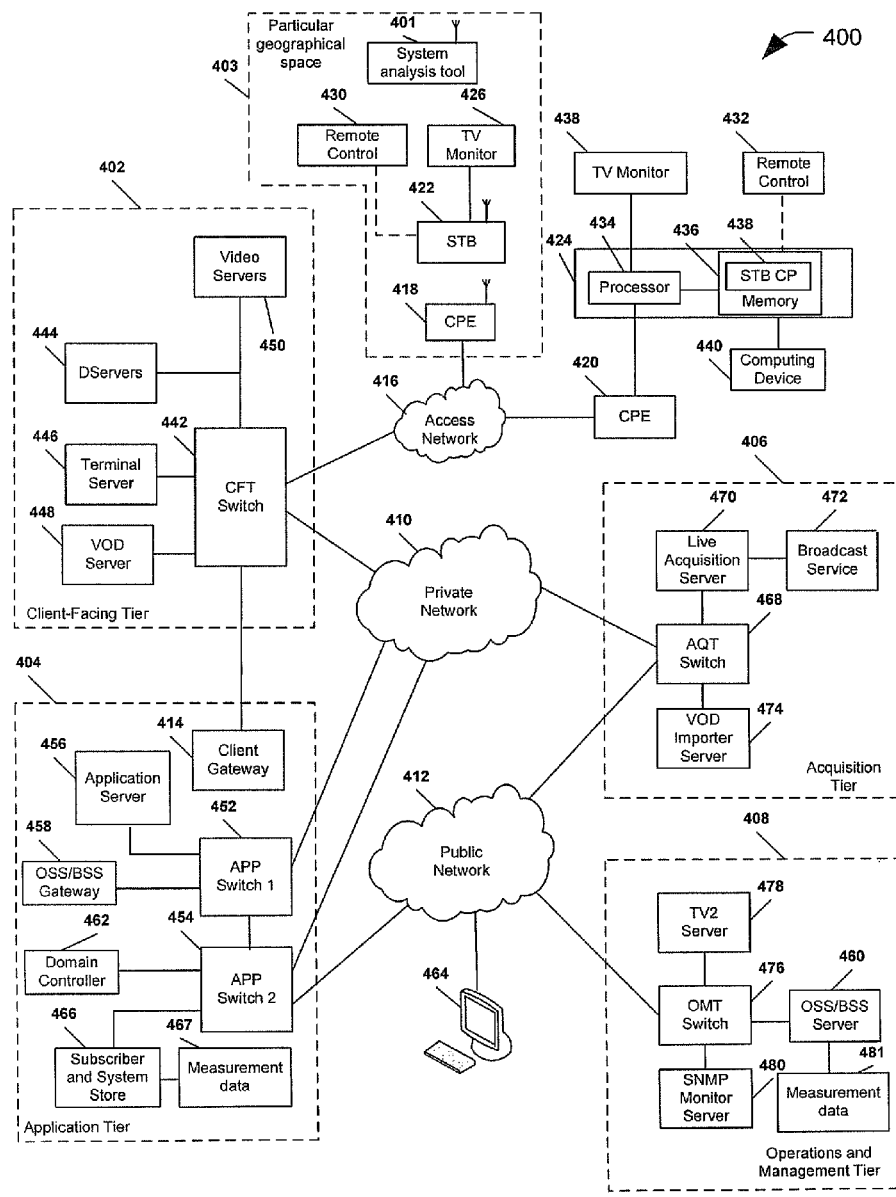
FIG. 4 is a diagram of a particular embodiment of an Internet protocol television system in which the systems of FIG. 1, FIG. 2, or FIG. 3 may be integrated.

FIG. 4 illustrates a particular embodiment of an Internet Protocol Television (IPTV) system 400. The system 400 can include a client facing tier 402, an application tier 404, an acquisition tier 406, and an operations and management tier 408. Each tier 402, 404, 406, 408 may be coupled to a private network 410, to a public network 412, such as the Internet, or to both the private network 410 and the public network 412. For example, the client-facing tier 402 can be coupled to the private network 410. Further, the application tier 404 can be coupled to the private network 410 and to the public network 412. The acquisition tier 406 can also be coupled to the private network 410 and to the public network 412. Additionally, the operations and management tier 408 can be coupled to the public network 412.

As illustrated in FIG. 4, the various tiers 402, 404, 406, 408 communicate with each other via the private network 410 and the public network 412. For instance, the client-facing tier 402 can communicate with the application tier 404 and the acquisition tier 406 via the private network 410. The application tier 404 can communicate with the acquisition tier 406 via the private network 410. Further, the application tier 404 can communicate with the acquisition tier 406 and the operations and management tier 408 via the public network 412. Moreover, the acquisition tier 406 can communicate with the operations and management tier 408 via the public network 412. In a particular embodiment, elements of the application tier 404, including, but not limited to a client gateway 414, can communicate directly with the client-facing tier 402.

The client-facing tier 402 can communicate with user equipment via an access network 416, such as an internet protocol television (IPTV) access network. In an illustrative embodiment, customer premises equipment (CPE) 418, 420 can be coupled to a local switch, router, or other device of the access network 416. The client-facing tier 402 can communicate with a first representative set-top box device 422 at a first subscriber premise wirelessly, via the first CPE 418, and can communicate with a second representative set-top box device 424 at a second subscriber premise via the second CPE 420. The CPE 418, 420 can include routers, local area network devices, modems, such as digital subscriber line (DSL) modems, residential gateways (e.g., the residential gateway 120 of FIG. 1 or the residential gateway 240 of FIG. 2) any other suitable devices for facilitating communication between a set-top box device and the access network 416, or any combination thereof.

The client-facing tier 402 can be coupled to the CPE 418, 420 via digital subscriber lines, coaxial cables, fiber optic cables, or other connectors. In a particular embodiment, the client-facing tier 402 is coupled to the CPE 418, 420 via fiber optic cables. In another particular embodiment, the CPE 418, 420 include digital subscriber line (DSL) modems that are coupled to one or more network nodes via twisted pairs. The client-facing tier 402 can be coupled to the network nodes via fiber-optic cables or other types of connectors. Each set-top box device 422, 424 can process data received via the access network 416 and via an IPTV software platform.

The first set-top box device 422 can be coupled to a first external display device, such as a first television monitor 426, and the second set-top box device 424 can be coupled to a second external display device, such as a second television monitor 428. Moreover, the first set-top box device 422 can communicate with a first remote control 430, and the second set-top box device 424 can communicate with a second remote control 432. The set-top box devices 422, 424 can include IPTV set-top box devices, video gaming devices or consoles that are adapted to receive IPTV content, personal computers or other computing devices that are adapted to emulate set-top box device functionalities, any other device adapted to receive IPTV content and transmit data to an IPTV system via an access network, or any combination thereof.

In an exemplary, non-limiting embodiment, each set-top box device 422, 424 can receive data, video, or any combination thereof, from the client-facing tier 402 via the access network 416 and render or display the data, video, or any combination thereof, at the television monitor 426, 428 to which it is coupled. In an illustrative embodiment, the set-top box devices 422, 424 can include tuners that receive and decode television programming signals or packet streams for transmission to the television monitors 426, 428. Further, the set-top box device 424 can include a STB processor 434 and a STB memory device 436 that is accessible to the STB processor 434. In one embodiment, a computer program, such as a STB computer program 438, can be embedded within the STB memory device 436.

The CPE 418, the STB 422, a remote control 430, and a TV monitor 426 may be situated in a particular geographical space 403, such as a residence or other premises associated with a subscriber. A system analysis tool 401 may be used in the particular geographical space 403 to assess the IPTV system 400 and service provided by the IPTV system 400 within the particular geographical space 403. The system analysis tool 401 may be configured to receive data from and transmit data to the CPE 418 wirelessly.

In an illustrative embodiment, the client-facing tier 402 can include a client-facing tier (CFT) switch 442 that manages communication between the client-facing tier 402 and the access network 416 and between the client-facing tier 402 and the private network 410. As illustrated in FIG. 4, the CFT switch 442 is coupled to one or more data servers, such as D-servers 444, that store, format, encode, replicate, or otherwise manipulate or prepare video content for communication from the client-facing tier 402 to the set-top box devices 422, 424. The CFT switch 442 can also be coupled to a terminal server 446 that provides terminal devices with a connection point to the private network 410. In a particular embodiment, the CFT switch 442 can be coupled to a video-on-demand (VOD) server 448 that stores or provides VOD content imported by the IPTV system 400. Further, the CFT switch 442 is coupled to one or more video servers 450 that receive video content and transmit the content to the set-top boxes 422, 424 via the access network 416.

In an illustrative embodiment, the client-facing tier 402 can communicate with a large number of set-top boxes, such as the representative set-top boxes 422, 424, over a wide geographic area, such as a regional area, a metropolitan area, a viewing area, a designated market area or any other suitable geographic area, market area, subscriber, or subscriber group that can be supported by networking the client-facing tier 402 to numerous set-top box devices. In a particular embodiment, the CFT switch 442, or any portion thereof, can include a multicast router or switch that feeds one or more video streams from a video server to multiple set-top box devices.

As illustrated in FIG. 4, the application tier 404 can communicate with both the private network 410 and the public network 412. The application tier 404 can include a first application tier (APP) switch 452 and a second APP switch 454. In a particular embodiment, the first APP switch 452 can be coupled to the second APP switch 454. The first APP switch 452 can be coupled to an application server 456 and to an OSS/BSS gateway 458. In a particular embodiment, the application server 456 can provide applications to the set-top box devices 422, 424 via the access network 416, which enable the set-top box devices 422, 424 to provide functions, such as display, messaging, processing of IPTV data and VOD material, etc. In a particular embodiment, the OSS/BSS gateway 458 includes operation systems and support (OSS) data, as well as billing systems and support (BSS) data. In one embodiment, the OSS/BSS gateway 458 can provide or restrict access to an OSS/BSS server 460 that stores operations and billing systems data.

The second APP switch 454 can be coupled to a domain controller 462 that provides Internet access, for example, to users at their computers 464 via the public network 412. For example, the domain controller 462 can provide remote Internet access to IPTV account information, e-mail, personalized Internet services, or other online services via the public network 412. In addition, the second APP switch 454 can be coupled to a subscriber and system store 466 that includes account information, such as account information that is associated with users who access the IPTV system 400 via the private network 410 or the public network 412. In an illustrative embodiment, the subscriber and system store 466 can store subscriber or subscriber data and create subscriber or subscriber profiles that are associated with IP addresses of corresponding set-top box devices 422, 424. The subscriber and system store 466 may receive measurement data 467 for storage at the subscriber and system store 466. For example, the measurement data 467 may include signal strength data and/or packet stream data mapped from one or more locations within the particular geographical space 403 and received from the system analysis tool 401.

In a particular embodiment, the application tier 404 can include a client gateway 414 that communicates data directly to the client-facing tier 402. In this embodiment, the client gateway 414 can be coupled directly to the CFT switch 442. The client gateway 414 can provide user access to the private network 410 and the tiers coupled thereto. In an illustrative embodiment, the set-top box devices 422, 424 can access the IPTV system 400 via the access network 416, using information received from the client gateway 414. User devices can access the client gateway 414 via the access network 416, and the client gateway 414 can allow such devices to access the private network 410 once the devices are authenticated or verified. Similarly, the client gateway 414 can prevent unauthorized devices, such as hacker computers or stolen set-top box devices, from accessing the private network 410, by denying access to these devices beyond the access network 416.

For example, when the first representative set-top box device 422 accesses the client-facing tier 402 via the access network 416, the client gateway 414 can verify subscriber information by communicating with the subscriber and system store 466 via the private network 410. Further, the client gateway 414 can verify billing information and status by communicating with the OSS/BSS gateway 458 via the private network 410. In one embodiment, the OSS/BSS gateway 458 can transmit a query via the public network 412 to the OSS/BSS server 460. After the client gateway 414 confirms subscriber and/or billing information, the client gateway 414 can allow the set-top box device 422 to access IPTV content and VOD content at the client-facing tier 402. If the client gateway 414 cannot verify subscriber information for the set-top box device 422, e.g., because it is connected to an unauthorized twisted pair, the client gateway 414 can block transmissions to and from the set-top box device 422 beyond the access network 416.

As indicated in FIG. 4, the acquisition tier 406 includes an acquisition tier (AQT) switch 468 that communicates with the private network 410. The AQT switch 468 can also communicate with the operations and management tier 408 via the public network 412. In a particular embodiment, the AQT switch 468 can be coupled to a live acquisition server 470 that receives or acquires television content, movie content, advertisement content, other video content, or any combination thereof, from a broadcast service 472, such as a satellite acquisition system or satellite head-end office. In a particular embodiment, the live acquisition server 470 can transmit content to the AQT switch 468, and the AQT switch 468 can transmit the content to the CFT switch 442 via the private network 410. In a particular embodiment, the content may include test data (e.g., generated test data having identifiable characteristics) to enable testing of a video transmission path between the live acquisition server 470 and a set-top box such as the set-top box 422.

In an illustrative embodiment, content can be transmitted to the D-servers 444, where it can be encoded, formatted, stored, replicated, or otherwise manipulated and prepared for communication from the video server(s) 450 to the set-top box devices 422, 424. The CFT switch 442 can receive content from the video server(s) 450 and communicate the content to the CPE 418, 420 via the access network 416. In a particular embodiment, the content may include test data. The set-top box devices 422, 424 can receive the content via the CPE 418, 420, and can transmit the content to the television monitors 426, 428. In an illustrative embodiment, video or audio portions of the content can be streamed to the set-top box devices 422, 424.

Further, the AQT switch 468 can be coupled to a video-on-demand importer server 474 that receives and stores television or movie content received at the acquisition tier 406 and communicates the stored content to the VOD server 448 at the client-facing tier 402 via the private network 410. Additionally, at the acquisition tier 406, the video-on-demand (VOD) importer server 474 can receive content from one or more VOD sources outside the IPTV system 400, such as movie studios and programmers of non-live content. The VOD importer server 474 can transmit the VOD content to the AQT switch 468, and the AQT switch 468, in turn, can communicate the material to the CFT switch 442 via the private network 410. The VOD content can be stored at one or more servers, such as the VOD server 448.

When users issue requests for VOD content via the set-top box devices 422, 424, the requests can be transmitted over the access network 416 to the VOD server 448 via the CFT switch 442. Upon receiving such requests, the VOD server 448 can retrieve the requested VOD content and transmit the content to the set-top box devices 422, 424 across the access network 416 via the CFT switch 442. The set-top box devices 422, 424 can transmit the VOD content to the television monitors 426, 428. In an illustrative embodiment, video or audio portions of VOD content can be streamed to the set-top box devices 422, 424.

FIG. 4 further illustrates that the operations and management tier 408 can include an operations and management tier (OMT) switch 476 that conducts communication between the operations and management tier 408 and the public network 412. In the embodiment illustrated by FIG. 4, the OMT switch 476 is coupled to a TV2 server 478. Additionally, the OMT switch 476 can be coupled to an OSS/BSS server 460 and to a simple network management protocol (SNMP) monitor 480 that monitors network devices within or coupled to the IPTV system 400. In a particular embodiment, the OMT switch 476 can communicate with the AQT switch 468 via the public network 412. The OSS/BSS server 460 can receive, store, and provide access to measurement data 481, such as signal strength data and/or packet stream data generated at the system analysis tool 401. For example, the OSS/BSS server 460 may store data collected from a test conducted, e.g., at a time of installation of a wireless system, such as the systems of FIGS. 1-4, or at a time subsequent to the installation. The stored data may be retrieved at a future time, such as when a new test is performed in response to a report of a system malfunction or a subscriber complaint. The retrieved stored data may serve as a baseline to perform a comparison that may facilitate troubleshooting.

In an illustrative embodiment, the live acquisition server 470 can transmit content to the AQT switch 468, and the AQT switch 468, in turn, can transmit the content to the OMT switch 476 via the public network 412. In this embodiment, the OMT switch 476 can transmit the content to the TV2 server 478 for display to users accessing the user interface at the TV2 server 478. For example, a user can access the TV2 server 478 using a personal computer (PC) 464 coupled to the public network 412.

Figure 5:
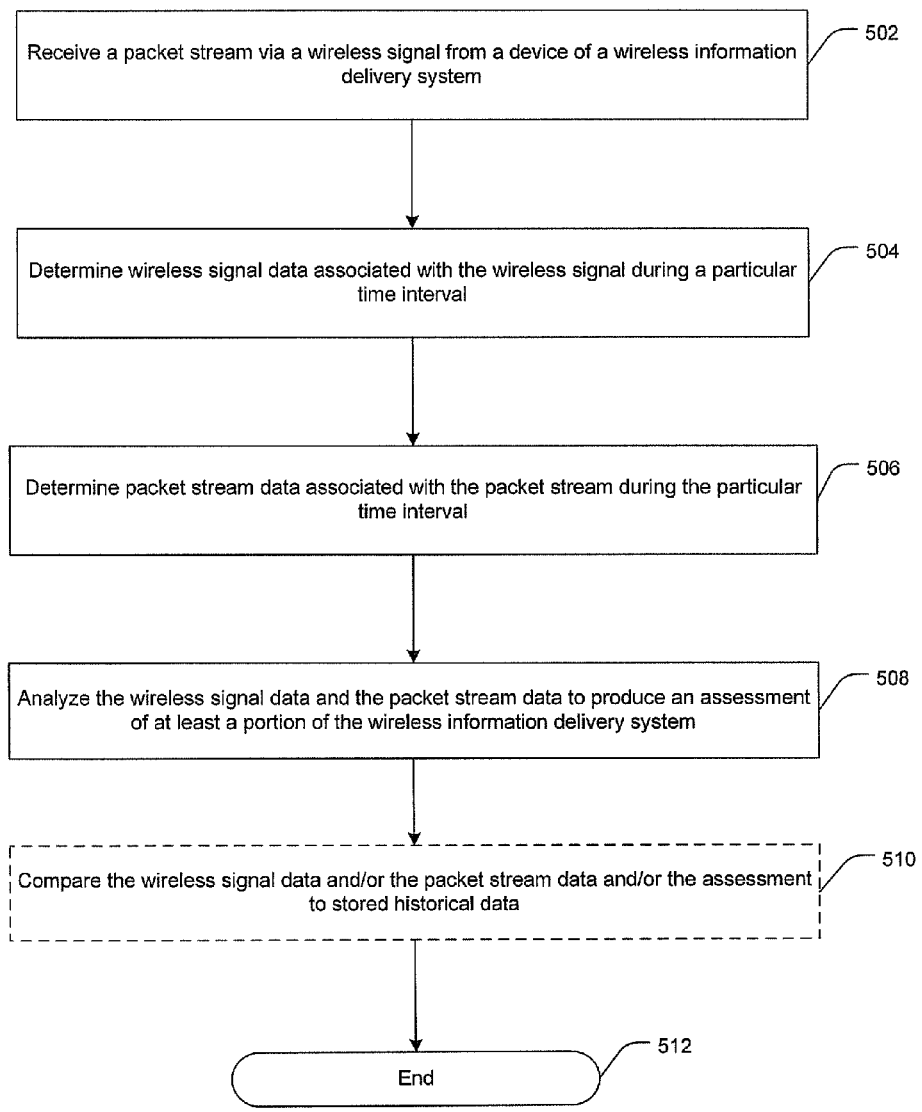
FIG. 5 is a flow diagram illustrating a first particular embodiment of a method of analyzing a wireless information delivery system.

FIG. 5 is a flow diagram illustrating a particular embodiment of a method of analyzing a wireless information delivery system, such as the wireless information delivery system of any of FIGS. 1-4. At 502, a packet stream may be received via a wireless signal from a device of a wireless information delivery system. In a particular embodiment, test data (e.g., predefined test data that may be generated) may be transmitted via the wireless information delivery system. In this embodiment, the packet stream received via the wireless information delivery system corresponds to the test data. At 504, wireless signal data associated with the wireless signal during a particular time interval may be determined. At 506, packet stream data associated with the packet stream during the particular time interval may be determined. In a particular embodiment, a series of measurements including wireless signal data and packet stream data may be determined at each of various geographical locations within a particular geographic area.

At 508, the wireless signal data and the packet stream data may be analyzed to produce an assessment of at least a portion of the wireless information delivery system. For example, the wireless signal data and the packet stream data may be correlated to determine a degree of correlation between the wireless signal data and the packet stream data. In a particular embodiment, a repair technician may create a current parameter map by mapping the wireless signal data and the packet stream data. The repair technician may troubleshoot a reported problem in a residential system by downloading an initial parameter map stored (e.g., at the OSS/BSS database 112) and comparing corresponding parameter values of the initial parameter map and the current parameter map to identify one or more differences that correlate to known causes (e.g., changed position of a set-top box, changed position of a wireless gateway, movement of furniture, or another cause of a symptom exhibited by the wireless information delivery system).

In a particular embodiment, the wireless signal data/packet stream data correlation may be determined by performing a first comparison of the wireless signal data to a signal parameter threshold and determining a wireless signal acceptability of the wireless signal data based upon the first comparison. A second comparison of the packet stream data to a packet stream parameter threshold may be performed and a packet stream acceptability may be determined based on the second comparison. The wireless signal acceptability may be compared to the packet stream acceptability to determine a degree of correlation between the wireless signal acceptability and the packet stream acceptability. In a particular embodiment, a suspected cause of a particular behavior of the wireless information delivery system may be determined based upon the wireless signal data/packet stream data correlation. In a particular embodiment, at 510, the wireless signal data and/or the packet stream data and/or the assessment may be compared to historical data, such as baseline data collected during installation of the wireless information delivery system, as part of a troubleshooting procedure applied to the wireless information delivery system. For example, RSSI may be measured at a particular location of a set-top box within a subscriber premises and may be compared with the RSSI that was measured and recorded at installation. A decrease of the RSSI by a particular amount, e.g., 10 decibels (dB), may prompt the service technician to verify that the wireless set-top box has not been relocated since installation. In another example, a change in configuration or use of the set-top boxes within the subscriber premises may be detected by comparing measurements of RSSI, a count of wireless set-top boxes, and/or a frequency of use of each of the currently installed wireless set-top boxes to historical data recorded during installation, and may prompt the service technician to relocate a particular wireless set-top box, change a wireless connection to a wired connection, or perform another action at the subscriber premises. The method ends at 512.

Figure 6:
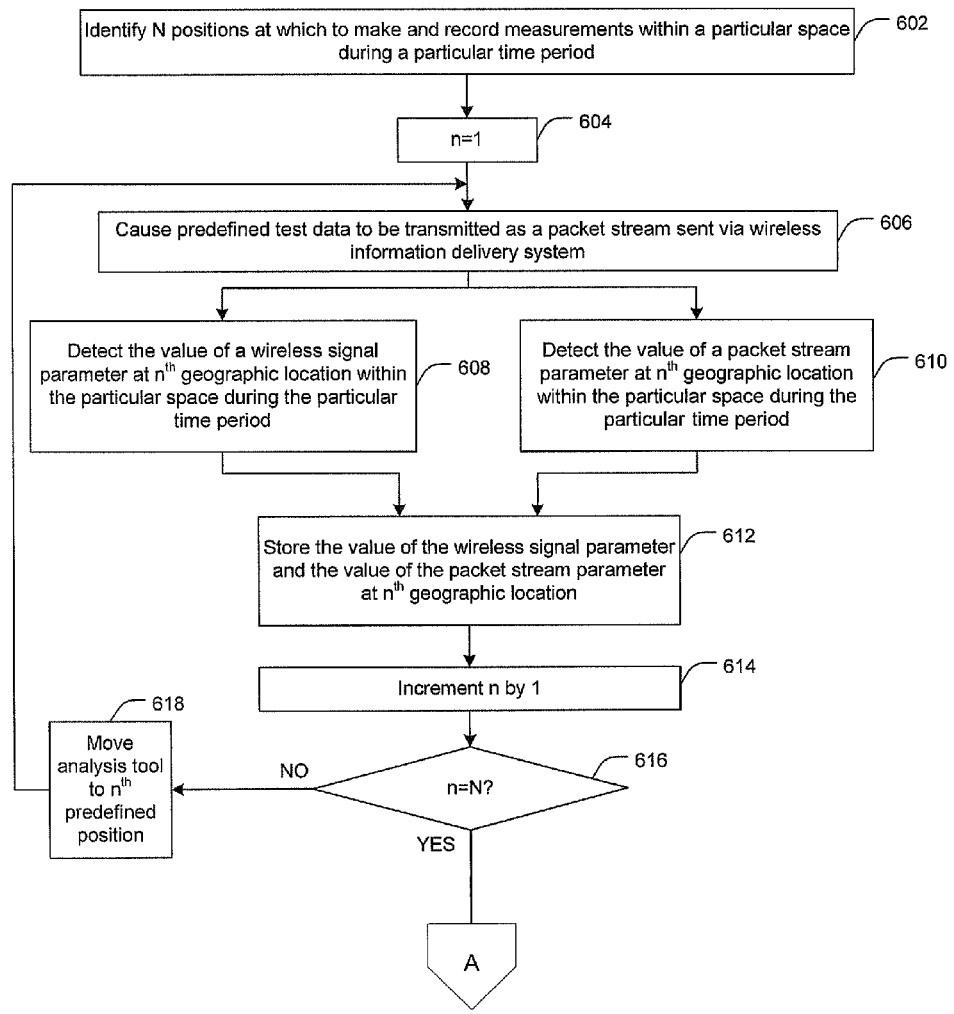
FIGS. 6A and 6B are flow diagrams illustrating a second particular embodiment of a method of analyzing a wireless information delivery system.
Figure 6:
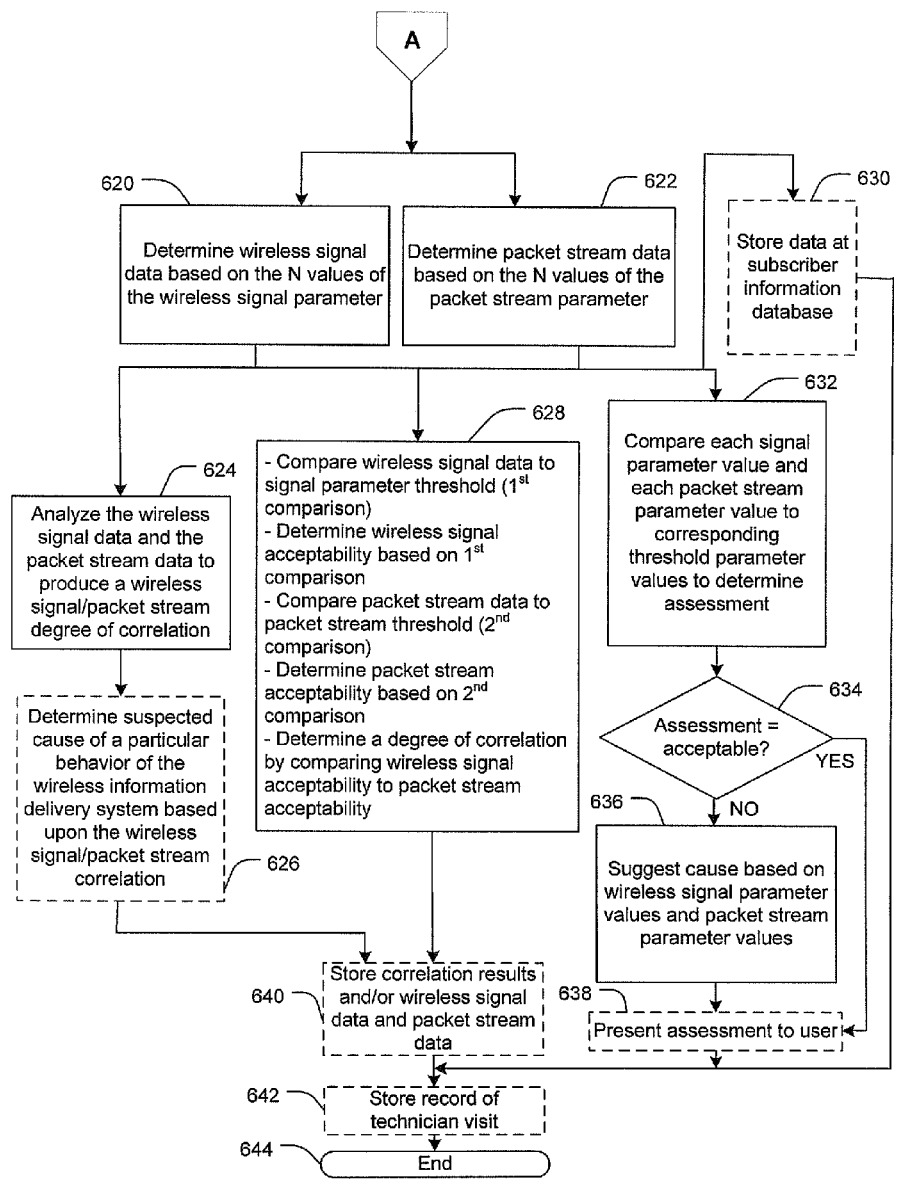

FIGS. 6A and 6B are flow diagrams illustrating a second particular embodiment of a method of analyzing a wireless information delivery system such as any of the wireless information delivery systems of FIGS. 1-4. FIG. 6A illustrates collecting wireless signal data and packet stream data at several geographical locations within a particular space. FIG. 6B illustrates analyzing the data collected using the method described in FIG. 6A.

At 602, N positions at which to record measurements during a particular time period are identified within a particular space, such as a residence or other premises associated with a subscriber. For example, the particular space may be a household within which a wireless information delivery system is operable. At 604, an index n is set equal to 1. At 606, predefined test data may be caused to be transmitted as a packet stream sent via the wireless information delivery system. The packet stream received via a wireless signal may correspond to the predefined test data. For example, the transceiver 106 of FIG. 1 may receive the wireless signal 124 that corresponds to predefined test data, such as the packet stream 110 generated by the packet stream generator 108. At 608, a value of a wireless signal parameter may be determined at an $n^{th}$ geographic location within the particular space during the particular time period. For example, the wireless signal data calculator 114 of FIG. 1 may determine the value of a selected wireless signal parameter. At 610, a packet stream parameter value may be detected at the $n^{th}$ geographic location within the particular space during the particular time period. For example, the packet data calculator 116 of FIG. 1 may determine the value of a selected packet stream parameter.

Proceeding to 612, the value of the wireless signal parameter and the value of the packet stream parameter measured at the $n^{th}$ geographic location are stored. Advancing to 614, the index n is incremented by 1, e.g., by setting n=n+1. Proceeding to 616, if n is not equal to N (the total number of positions at which to make and record measurements), more measurements are to be taken and the method proceeds to 618. At 618, the analysis tool may be moved to the new $n^{th}$ predefined position. Returning to 606, predefined test data may be caused to be transmitted as a packet stream sent via the wireless information delivery system. The method then proceeds to detect and store the values of the wireless signal parameter and the packet stream parameter at the $n^{th}$ geographic position.

At 616, if n is equal to N, advancing to 620 (see FIG. 6B), wireless signal data may be determined based on the N stored values of the wireless signal parameter. Proceeding to 622, packet stream data may be determined based on the N stored values of the packet stream parameter. For example, a first value of a wireless signal parameter may be detected at a first geographic location within the particular space during the particular time interval and a second value of the wireless signal parameter may be detected at a second geographic location within the particular space during the particular time interval. At 620, the wireless signal data may be determined based on the first value of the wireless signal parameter and the second value of the wireless signal parameter. Additionally, a first value of a packet stream parameter may be detected at the first geographic location within the particular space during the particular time period and the second packet stream data may be detected at the second geographic location within the particular space during the particular time period. At 622, the packet stream data may be determined based on the first value of the packet stream parameter and the second value of the packet stream parameter.

After the wireless signal data and the packet stream data are determined, additional processing may be performed based on the wireless signal data and the packet stream data. For example, at 624 the wireless signal data and the packet stream data may be analyzed by correlating the wireless signal data and the packet stream data to produce a wireless signal/packet stream correlation. At 626, a suspected cause of a particular behavior of the wireless information delivery system may be determined based upon the wireless signal/packet stream correlation. At 640, the correlated results may be stored. At 642, a record of a technician visit may be stored. The method ends at 644.

In another example of additional processing that may be performed based on the wireless signal data and the packet stream data, at 628, the wireless signal data may be compared to a signal parameter threshold in a first comparison. A wireless signal acceptability may be determined based on the first comparison. The packet stream data may be compared to a packet stream threshold in a second comparison. A packet stream acceptability may be determined based on the second comparison. The wireless signal acceptability may be compared to the packet stream acceptability to determine a degree of correlation. At 640, correlated results, such as the degree of correlation and/or wireless signal data and packet stream data may be stored and may be used, e.g., for troubleshooting by comparing to a correlation factor or wireless signal data and packet stream data determined at a future time. Proceeding to 642, a record of a technician visit to the particular geographic area may be stored for future reference, e.g., at an OSS/BSS database, such as the OSS/BSS database 112 of FIG. 1. The stored record may include the correlated results and an indication of a reason for the technician visit, e.g., initial installation, response to a subscriber-reported problem, or another reason. The method ends at 644.

In another example of additional processing that may be performed based on the wireless signal data and the packet stream data, at 630, the wireless signal data and the packet stream data may be stored at a subscriber information database, such as the OSS/BSS database 112 of FIG. 1. The method ends at 644.

In another example of additional processing that may be performed based on the wireless signal data and the packet stream data, at 632, each signal parameter value and each packet stream parameter value may be compared to corresponding threshold parameter values to determine an assessment. For example, an initial parameter map stored at the OSS/BSS database 112 may be downloaded. Parameter values, such as the wireless signal parameter and packet stream parameter values, may be compared to corresponding parameter values (e.g., threshold parameters) stored in the initial parameter map.

Advancing to 634, when the assessment is determined to be unacceptable, at 636, a cause may be suggested based on the wireless signal parameter values and based on the packet stream parameter values. At 638, the assessment may be presented to a user (e.g., a repair technician). Returning to 634, when the assessment is determined to be acceptable, at 638, the assessment may be presented to the user. The method ends at 644.

Figure 7:
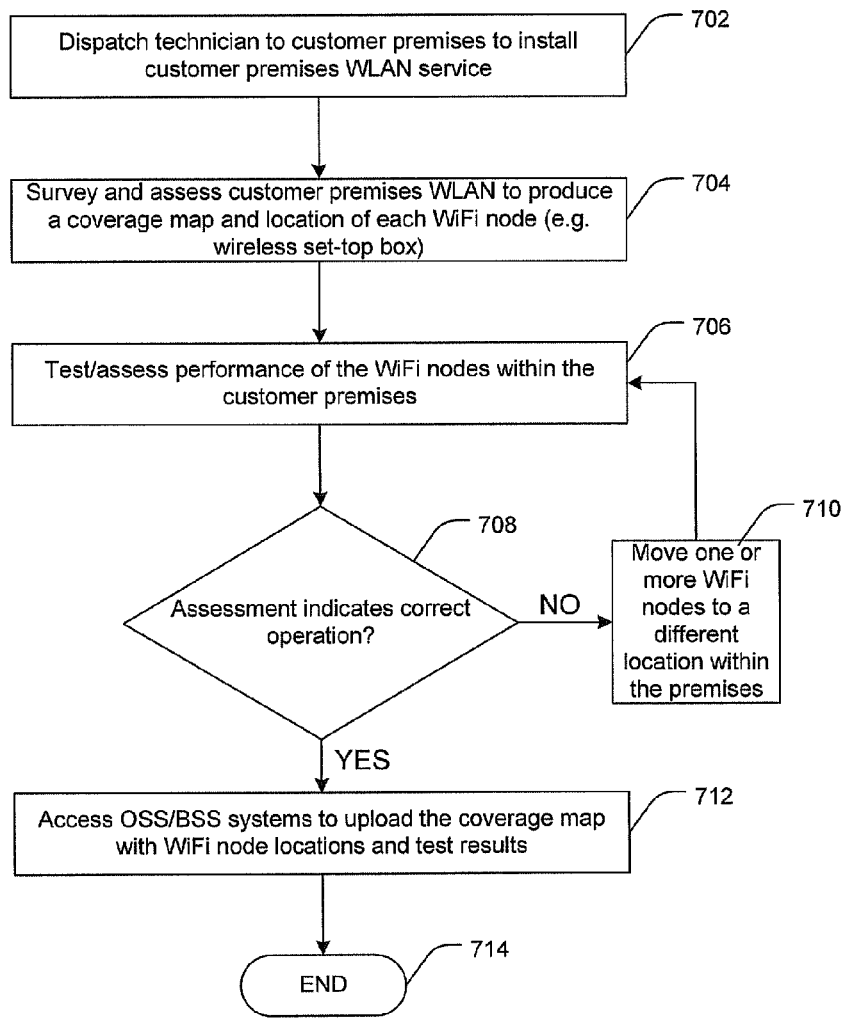
FIG. 7 is a flow diagram illustrating an embodiment of a method of assessing a wireless information delivery system.

FIG. 7 is a flow diagram illustrating a particular embodiment of a method of assessing a wireless information delivery system. For example, the method of FIG. 7 may be used by a technician in the field. At 702, a technician may be dispatched to a subscriber premises to install a subscriber premises wireless local area network (WLAN) service. Proceeding to 704, the technician may survey and assess the subscriber premises wireless local area network and may produce a coverage map. For example, the technician may use an apparatus such as the apparatus of FIGS. 1-3 according to the methods of FIGS. 5, 6A and/or 6B to produce the coverage map that maps wireless signal data and packet stream data at one or more geographic locations within a particular space. The map may include an indication of a location of any wireless (WiFi) nodes, such as a set-top box device. Moving to 706, the wireless information delivery system may be assessed at one or more of the WiFi nodes within the subscriber premises. In a particular embodiment, the assessment may be carried out by creating a current parameter map including wireless signal data, such as the wireless signal data 128, and packet stream data such as the packet stream data 130, and comparing corresponding values of the current parameter map and an initial parameter map that is downloaded from the OSS/BSS database 112.

Advancing to 708, when the assessment indicates that the wireless information delivery system may not be operating properly or correctly, one or more of the nodes or a residential gateway is moved to a different location within the subscriber premises, at 710. Returning to 706, the wireless information delivery system may again be tested and assessed. Proceeding again to 708, when the assessment indicates correct operation of the wireless information delivery system within the subscriber premises, an operations systems server/billing systems server (OSS/BSS) systems, such as OSS/BSS server 460 of FIG. 4, may be accessed to upload a coverage map that may include indications of any or all of WiFi node locations and that may include a residential gateway location, wireless signal data, packet stream data, and assessment results, at 712. The method ends at 714.

Figure 8:
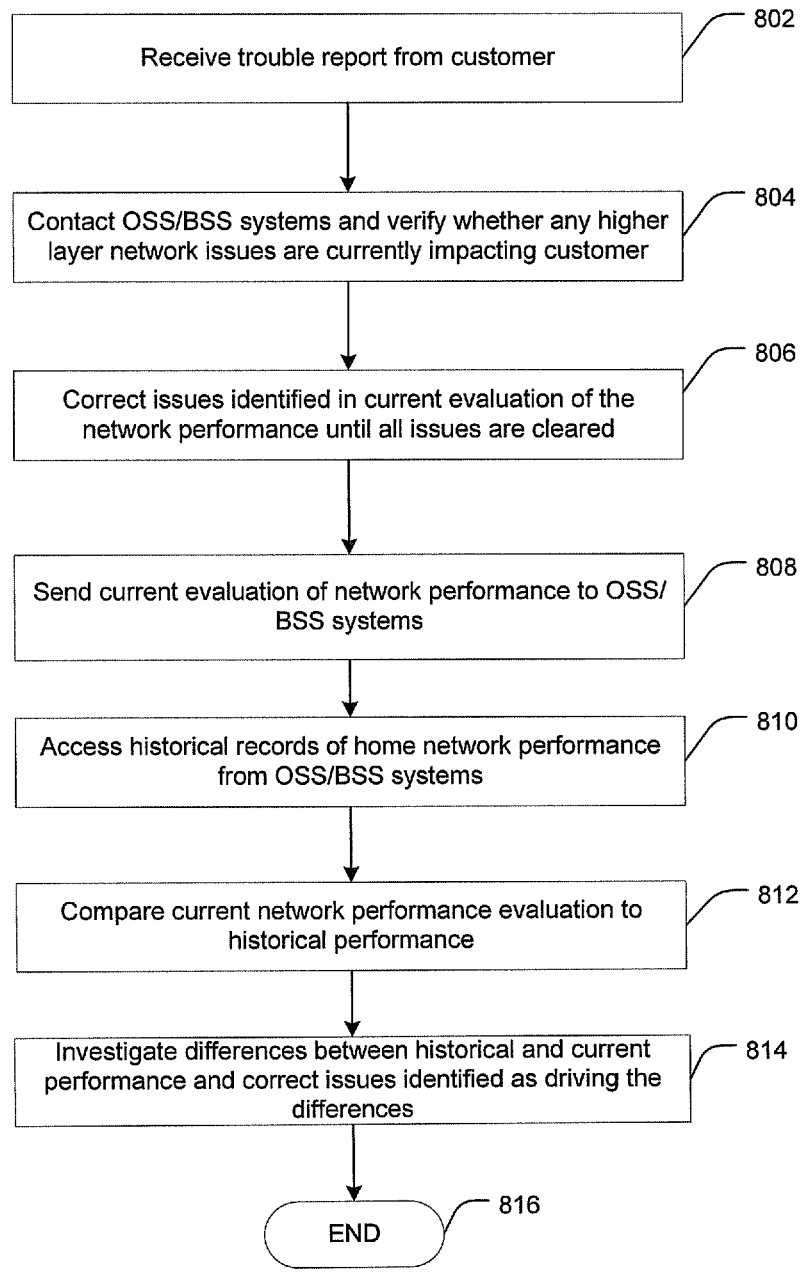
FIG. 8 is a flow diagram illustrating a first particular embodiment of a method of responding to a problem associated with a wireless information delivery system.

FIG. 8 is a flow diagram illustrating a particular embodiment of a method of a responding to a problem associated with a wireless information delivery system. At 802, a trouble report may be received from a subscriber. Proceeding to 804, OSS/BSS systems may be contacted to verify whether any higher layer network issues are impacting the subscriber that are potential causes of a symptom reported in the trouble report. Proceeding to 806, issues identified in an evaluation of the network performance may be corrected until all issues are cleared. For example, a service technician may access a system that displays alerts relating to network outages that result in a degradation of service to specific geographical areas. If the degradation is consistent with trouble experienced by a subscriber, there may be no need to troubleshoot the degradation of service within a subscriber premises. In a particular example, a subscriber reporting difficulty receiving inbound telephone calls may prompt the service technician to check a status of voice over internet protocol (VoIP) servers to determine whether error conditions, alarms, or impairments are present at one or more of the VoIP servers. A determination that an error condition or other impairment is present at any of the VoIP servers ("upstream") may prompt the service technician to correct the error condition or other impairment upstream, instead of in the subscriber premises. In another example, the service technician may access a diagnostic system to perform diagnostic tests on a digital subscriber line (DSL) or other communication path to the subscriber premises. The diagnostic system may identify impairments, such as a presence of one or more bridge taps, electromagnetic interference, impedance mismatch, time domain reflectrometry/frequency domain reflectrometry traces, noise margin, DSL re-initialization, code violation errors, one or more errored seconds, one or more unavailable seconds, or other impairments. Discovering such an impairment may prompt the service technician to initiate dispatch of an expert in repair of telephone cable to resolve the subscriber complaint. Proceeding to 808, a current evaluation of network performance may be sent to the OSS/BSS systems. The current evaluation may be based upon, e.g., wireless signal parameter data and packet stream data measured by a system analysis tool, such as the system analysis tool of FIG. 1, the system analysis tool 201 of FIG. 2, or the system analysis tool 301 of FIG. 3. The current evaluation may be, e.g., stored at the OSS/BSS systems, such as OSS/BSS server 460 of FIG. 4. For example, a time-stamped parameter map identifying a particular date on which parameter measurements were made may be constructed by mapping wireless signal parameter data and packet stream data, and the time-stamped parameter map may be uploaded to the OSS/BSS server 460 of FIG. 4. Moving to 810, historical records of network performance associated with a wireless network of the subscriber may be accessed from the OSS/BSS systems. For example, an initial parameter map may be downloaded from the OSS/BSS systems, such as the OSS/BSS server 460 of FIG. 4. Proceeding to 812, the current network performance may be compared to the historical performance, e.g., by comparing the time-stamped parameter map to the initial parameter map. Advancing to 814, differences between the historical and current performance may be investigated and issues may be identified as driving the differences may be corrected. The method ends at 816.

Figure 9:
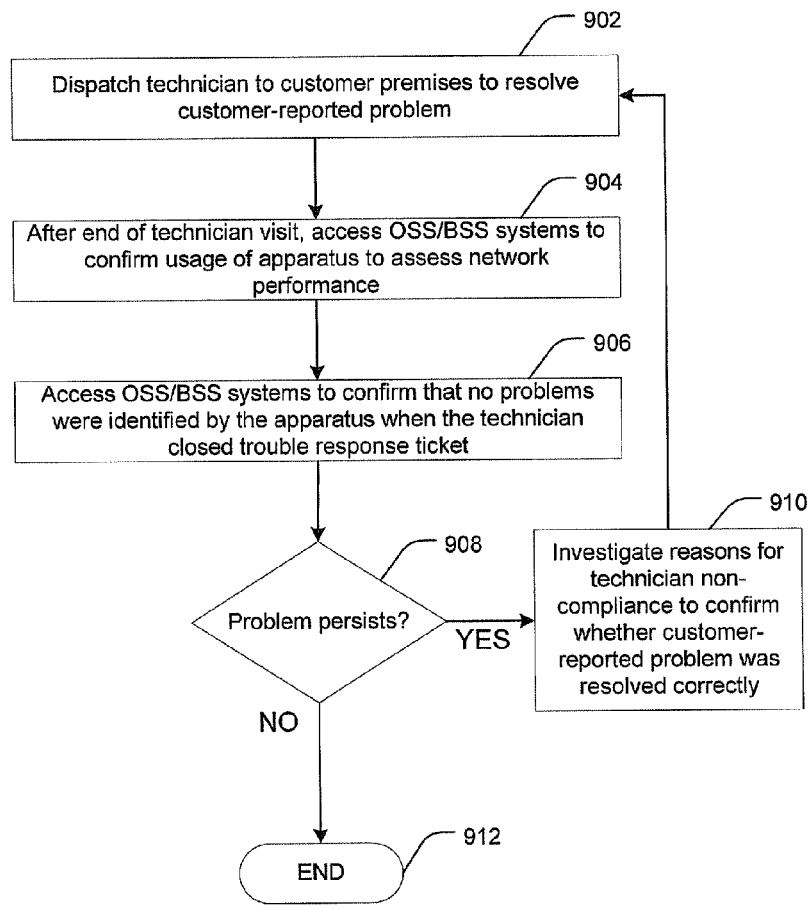
FIG. 9 is a flow diagram illustrating a second particular embodiment of a method of responding to a problem associated with a wireless information delivery system.

FIG. 9 is a flow diagram illustrating a particular embodiment of a method of responding to a problem associated with a wireless information delivery system, such as a WiFi system installed at a subscriber premises. At 902, a technician may be dispatched to visit the subscriber premises to resolve a problem reported by a subscriber. Proceeding to 904, at the end of the technician visit, OSS/BSS systems, such as OSS/BSS server 460 of FIG. 4, may be accessed to confirm usage of an apparatus, such as the system analysis tool 101 of FIG. 1 the system analysis tool 201 of FIG. 2, or the system analysis tool 301 of FIG. 3, to assess network performance of the wireless information delivery system. Moving to 906, the OSS/BSS systems may be accessed to review a stored record of the technician visit to confirm that no problems were identified by the apparatus when the technician closed a trouble response ticket. For example, the stored record may indicate that the technician fixed a cause of intermittent reception of media content. Corrected problems may include any of a defect in subscriber premises wiring, error conditions in a DSL or other link to the subscriber premises, and failed or non-responding equipment such as a residential gateway, a set-top box, or a digital video recorder (DVR), or a combination thereof. Proceeding to 908, if the problem persists, the method proceeds to 910 and reasons may be investigated for technician noncompliance to confirm whether the subscriber-reported problem was resolved correctly. Returning to 902, a technician may again be dispatched to the subscriber premises to resolve the problem described in the subscriber trouble report and the method proceeds to 904 and 906. Returning to 908, if the problem does not persist, the method ends at 912.

Figure 10:
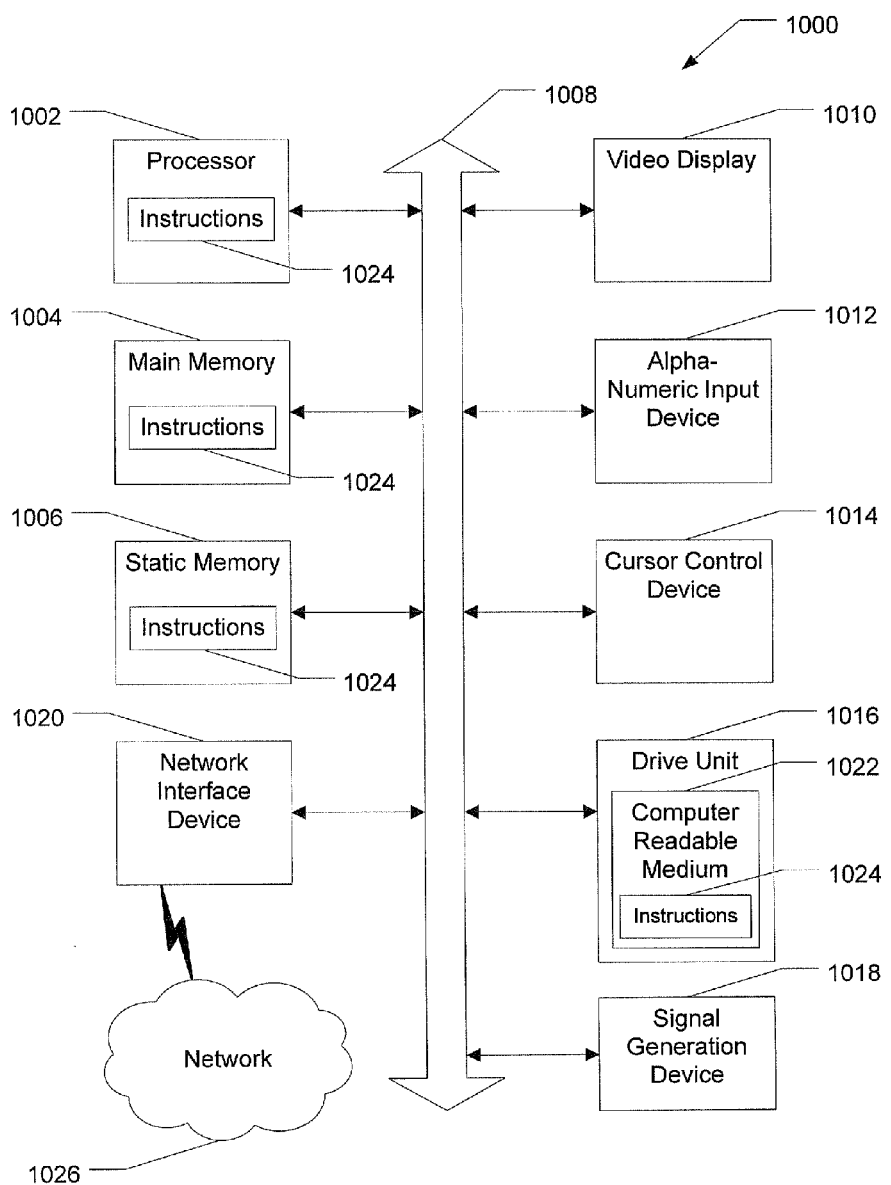
FIG. 10 is an illustration of a general computer system operable to support embodiments of computer-implemented methods, computer program products, and system components as illustrated in FIGS. 1-9.

Referring to FIG. 10, an illustrative embodiment of a general computer system is shown and is designated 1000. For example, the computer system 1000 may include, implement, or be implemented by one or more components of the systems and apparatuses of FIGS. 1-4. The computer system 1000 includes a set of instructions 1024 that may be executed to cause the computer system 1000 to perform any one or more of the methods or computer based functions disclosed herein. The computer system 1000, or any portion thereof, may operate as a standalone device or may be connected, e.g., using a network, to other computer systems or peripheral devices.

In a networked deployment, the computer system 1000 may operate in the capacity of a set-top box device, a personal computing device, a mobile computing device, a wireless system analysis tool, or some other computing device. The computer system 1000 may also be implemented as or incorporated into various devices, such as a personal computer (PC), a tablet PC, a personal digital assistant (PDA), a mobile device, a palmtop computer, a laptop computer, a desktop computer, a communications device, or any other machine capable of executing a set of instructions (sequential or otherwise) that specify actions to be taken by that machine. In a particular embodiment, the computer system 1000 may be implemented using electronic devices that provide voice, video, or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics-processing unit (GPU), or both. Moreover, the computer system 1000 may include a main memory 1004 and a static memory 1006 that may communicate with each other via a bus 1008. As shown, the computer system 1000 may further include or be coupled to a video display unit 1010, such as a liquid crystal display (LCD), an organic light emitting diode (OLED), a flat panel display, a solid-state display, or a projection display. Additionally, the computer system 1000 may include an input device 1012, such as a keyboard, a remote control device, and a cursor control device 1014, such as a mouse. In a particular embodiment, the cursor control device 1014 may be incorporated into a remote control device. The computer system 1000 may also include a disk drive unit 1016, a signal generation device 1018, such as a speaker, and a network interface device 1020. The network interface device 1020 may be coupled to other devices (not shown) via a network 1026, such as the network 118 of FIG. 1.

In a particular embodiment, as depicted in FIG. 10, the disk drive unit 1016 may include a tangible computer-readable medium 1022 in which one or more sets of instructions 1024, e.g. software, may be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 1002 also may include tangible computer-readable media.

In an alternative embodiment, dedicated hardware implementations, such as application specific integrated circuits, programmable logic arrays and other hardware devices, may be constructed to implement one or more of the methods described herein. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by the computer system 1000. Further, in an exemplary, non-limited embodiment, implementations may include distributed processing, component/item distributed processing, and parallel processing. Alternatively, virtual computer system processing may be used to implement one or more of the methods or functionality as described herein.

The present disclosure contemplates a tangible computer-readable (e.g., non-transitory) medium that includes instructions 1024 so that a device connected to the network 1026 may communicate voice, video, or data over the network 1026. Further, the instructions 1024 may be transmitted or received over the network 1026 via the network interface device 1020.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible (e.g., non-transitory) medium that is capable of storing a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes. Accordingly, the disclosure is considered to include any one or more of a computer-readable storage medium and successor media, in which data or instructions may be stored.

It should also be noted that software that implements the disclosed methods may optionally be stored on a tangible storage medium, such as: a magnetic medium, e.g., a disk or tape; a magneto-optical or optical medium, e.g., a disk; or a solid state medium, e.g., a memory card or other package that houses one or more read-only (non-volatile) memories, random access memories, or other re-writable (volatile) memories.

Although the present specification describes components and functions that may be implemented in particular embodiments with reference to particular standards and protocols, the disclosure is not limited to such standards and protocols. For example, standards for Internet, other packet switched network transmission (e.g. TCP/IP, UDP/IP, X10, SIP, TR-069, INSTEON, WEP, and Wi-Fi) and standards for viewing media content (e.g. MPEG and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this disclosure to any particular concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving a packet stream via a wireless signal from a wireless information delivery system;
   determining wireless signal data associated with the wireless signal during a particular time interval;
   determining packet stream data associated with the packet stream during the particular time interval;
   analyzing the wireless signal data and the packet stream data to produce an assessment of the wireless information delivery system, wherein producing the assessment comprises:
      comparing a wireless signal parameter value associated with the wireless signal data to a corresponding wireless signal threshold parameter value; and
      comparing a packet stream parameter value associated with the packet stream data to a corresponding packet stream threshold parameter value; and
   in response to a determination of the assessment being unacceptable, suggesting a cause of the assessment being unacceptable based on the wireless signal parameter value and based on the packet stream parameter value.

2. The method of claim 1, further comprising causing predefined test data to be transmitted via the wireless information delivery system, wherein the packet stream received via the wireless signal corresponds to the predefined test data.

3. The method of claim 1, further comprising detecting the wireless signal parameter value at a first geographic location within a particular space and detecting a second wireless signal parameter value at a second geographic location within the particular space, wherein the wireless signal data is determined based on the wireless signal parameter value and the second wireless signal parameter value.

4. The method of claim 1, further comprising detecting the packet stream parameter value at a first geographic location within a particular space and detecting second packet stream data at a second geographic location within the particular space, wherein the packet stream data is determined based on the packet stream parameter value and the second packet stream data.

5. The method of claim 1, wherein analyzing the wireless signal data and the packet stream data comprises determining a wireless signal/packet stream correlation by comparing the wireless signal data and the packet stream data.

6. The method of claim 5, further comprising determining a suspected cause of a particular behavior of the wireless information delivery system based upon the wireless signal/packet stream correlation.

7. The method of claim 1, wherein analyzing the wireless signal data and the packet stream data comprises:
   performing a first comparison of the wireless signal data to a signal parameter threshold;
   determining a wireless signal acceptability based on the first comparison;
   performing a second comparison of the packet stream data to a packet stream parameter threshold;
   determining a packet stream acceptability based on the second comparison; and
   determining a degree of wireless signal and packet stream correlation by comparing the wireless signal acceptability to the packet stream acceptability.

8. The method of claim 1, wherein analyzing the wireless signal data and the packet stream data further comprises determining whether the assessment is acceptable based on the wireless signal parameter value and based on the packet stream parameter value.

9. The method of claim 1, further comprising presenting the assessment of the wireless information delivery system to a user.

10. The method of claim 1, further comprising storing, at a subscriber information database, the wireless signal data, the packet stream data, an identifier associated with a subscriber, and an identifier of the particular time interval.

11. An apparatus comprising:
    a system analysis tool including a processor configured to execute instructions to:
       determine wireless signal data associated with a wireless signal received from a device of a wireless information delivery system during a particular time interval;
       determine packet stream data associated with a packet stream received during the particular time interval via the wireless signal;
       analyze the wireless signal data and the packet stream data to produce an assessment of the wireless information delivery system,
       wherein producing the assessment comprises:
          comparing a wireless signal parameter value associated with the wireless signal data to a corresponding wireless signal threshold parameter value; and
          comparing a packet stream parameter value associated with the packet stream data to a corresponding packet stream threshold parameter value; and
       in response to a determination of the assessment being unacceptable, suggesting a cause of the assessment being unacceptable based on the wireless signal parameter value and based on the packet stream parameter value.

12. The apparatus of claim 11, wherein the system analysis tool is configured to cause predefined test data to be transmitted via the device of the wireless information delivery system, and wherein the packet stream sent via the wireless signal corresponds to the predefined test data.

13. The apparatus of claim 11, wherein the system analysis tool is configured to detect the wireless signal parameter value at a first geographic location within a particular space and to detect a second wireless signal parameter value at a second geographic location within the particular space, and wherein the wireless signal data is determined based on the wireless signal parameter value and the second wireless signal parameter value.

14. The apparatus of claim 13, wherein the system analysis tool is configured to detect the packet stream parameter value at the first geographic location within the particular space and to detect a second packet stream parameter value at the second geographic location within the particular space, and wherein the packet stream data is determined based on the packet stream parameter value and the second packet stream parameter value.

15. The apparatus of claim 14, wherein analyzing the wireless signal data and the packet stream data comprises determining a wireless signal acceptability by comparing at least one of the first wireless signal parameter value or the second wireless signal parameter value to a wireless signal threshold;

determining a packet stream acceptability by comparing at least one of the first packet stream parameter value or the second packet stream parameter value to a packet stream threshold; and determining a degree of correlation between the wireless signal acceptability and the packet stream acceptability.

16. The apparatus of claim 11, wherein the system analysis tool is configured to store, at a subscriber information database, the wireless signal data, the packet stream data, an identifier of a subscriber, and an identifier of the particular time interval.

17. The apparatus of claim 16, wherein the subscriber information database resides at a server that is distinct from the apparatus.

18. A computer-readable storage device storing processor-executable instructions that, when executed by a processor, cause the processor to perform operations comprising:

receiving a packet stream via a wireless signal from a device of a wireless information delivery system;

determining wireless signal data associated with the wireless signal during a particular time interval;

determining packet stream data associated with the packet stream during the particular time interval;

analyzing the wireless signal data and the packet stream data to produce an assessment of the wireless information delivery system, wherein producing the assessment comprises:

comparing a wireless signal parameter value associated with the wireless signal data to a corresponding wireless signal threshold parameter value; and comparing a packet stream parameter value associated with the packet stream data to a corresponding packet stream threshold parameter value; and in response to a determination of the assessment being unacceptable, suggesting a cause of the assessment being unacceptable based on the wireless signal parameter value and based on the packet stream parameter value.

19. The computer-readable storage device of claim 18, wherein analyzing the wireless signal data and the packet stream data comprises producing a wireless signal and packet stream correlation by comparing the wireless signal data and the packet stream data.

20. The computer-readable storage device of claim 19, wherein the operations further comprise determining a suspected cause of a particular behavior of the wireless information delivery system based upon the wireless signal and packet stream correlation.

* * * * *